United States Patent
Qian et al.

(10) Patent No.: US 7,424,025 B2
(45) Date of Patent: Sep. 9, 2008

(54) METHODS AND SYSTEMS FOR PER-SESSION DYNAMIC MANAGEMENT OF MEDIA GATEWAY RESOURCES

(75) Inventors: Edward Y. Qian, Plano, TX (US); David Z. Lu, Dallas, TX (US); San-Qi Li, Plano, TX (US); Yen Shei, Plano, TX (US); Weijun Lee, Plano, TX (US)

(73) Assignee: Santera Systems, Inc., Plano, TX (US)

( * ) Notice: Subject to any disclaimer, the term of this patent is extended or adjusted under 35 U.S.C. 154(b) by 912 days.

(21) Appl. No.: 10/676,233

(22) Filed: Oct. 1, 2003

(65) Prior Publication Data
US 2005/0074017 A1    Apr. 7, 2005

(51) Int. Cl.
*H04L 12/66* (2006.01)
(52) U.S. Cl. ............... 370/409; 370/395.2; 370/395.3; 370/395.52; 370/395.5; 370/395.53; 370/395.6; 370/397; 370/398; 370/399; 370/466; 370/467
(58) Field of Classification Search ............... 370/395.2, 370/395.3, 395.52, 395.5, 395.53, 409, 395.6, 370/397, 398, 399, 466, 467
See application file for complete search history.

(56) References Cited

U.S. PATENT DOCUMENTS

| | | | | |
|---|---|---|---|---|
| 6,061,348 | A * | 5/2000 | Castrigno et al. | ............ 370/363 |
| 6,633,563 | B1 * | 10/2003 | Lin et al. | .................... 370/389 |
| 6,714,535 | B1 | 3/2004 | Herh | |
| 6,771,673 | B1 | 8/2004 | Baum et al. | |
| 6,879,667 | B1 * | 4/2005 | Carew et al. | ............. 379/88.17 |
| 7,177,943 | B1 * | 2/2007 | Temoshenko et al. | ........ 709/237 |
| 7,185,094 | B2 * | 2/2007 | Marquette et al. | ........... 709/225 |
| 7,212,519 | B2 * | 5/2007 | Johnson et al. | ............. 370/352 |
| 2002/0012352 | A1 * | 1/2002 | Hansson et al. | ............. 370/401 |
| 2002/0016926 | A1 | 2/2002 | Nguyen et al. | |

(Continued)

OTHER PUBLICATIONS

International Search Report and Written Opinion for International Application No. PCT/US04/31920 (Mar. 4, 2005).

(Continued)

*Primary Examiner*—Edan Orgad
*Assistant Examiner*—Wutchung Chu
(74) *Attorney, Agent, or Firm*—Jenkins, Wilson, Taylor & Hunt, P.A.

(57) ABSTRACT

Methods and systems for per-session dynamic management of media gateway resources are disclosed. According to one method, the logical and physical resources in a media gateway are divided and dynamically managed at the Transport Layer (i.e. OBI Layer 4), which results in finer granularity than managing such resources statically at the Data Link Layer (i.e. OBI Layer 2) or Network Layer (i.e. OBI Layer 3). Voice-processing resources provided by voice server cards may be pooled into a common pool available to all external networks. For each new call/session, the dynamic resource manager of the media gateway dynamically allocates a voice chip from the pooled voice processing resources, and assigns a logical resource identifier (e.g. a local IP and local UDP pair) to the session. When a network interface card receives incoming voice packets, it checks the destination IP and UDP and optionally the source IP and UDP to find out, and forward voice packets to, the voice chip assigned to the session.

40 Claims, 6 Drawing Sheets

U.S. PATENT DOCUMENTS

| | | | |
|---|---|---|---|
| 2002/0051464 A1* | 5/2002 | Sin et al. | 370/466 |
| 2002/0191612 A1* | 12/2002 | Curtis | 370/392 |
| 2003/0118039 A1 | 6/2003 | Nishi et al. | |
| 2003/0142795 A1 | 7/2003 | Gavette et al. | |
| 2004/0066782 A1* | 4/2004 | Nassar | 370/389 |
| 2007/0083528 A1* | 4/2007 | Matthews et al. | 707/10 |

OTHER PUBLICATIONS

International Search Report and Written Opinion for International Application No. PCT/US04/31918 (Feb. 11, 2005).

Yoo et al., "A Media Stream Processing of VoIP Media Gateway," IEEE, pp. 91-94 (2003).

* cited by examiner

METHODS AND SYSTEMS FOR PER-SESSION DYNAMIC MANAGEMENT OF MEDIA GATEWAY RESOURCES

TECHNICAL FIELD

The present invention relates to methods and systems for media gateway (MG) resource allocation. More particularly, the present invention relates to methods and systems for dynamically allocating media gateway resources from a shared pool of media gateway resources on a per call (i.e., per session) basis.

RELATED ART

In modern telephony networks, media switching and call control functionality are separated. Call control, which includes setting up and tearing down calls and maintaining call state machines, is performed by a network entity referred to as a media gateway controller (MGC). Media stream switching, which includes switching media packets between input and output ports and converting the media packets into the appropriate formats for the sending and receiving parties, is performed by a media gateway (MG). Media gateway controllers communicate call control information to media gateways via a media gateway control protocol. Typical media gateway control protocols, such as MGCP and MEGACO, include commands for communicating information about each endpoint of a session to the media gateway and instructing the media gateway as to how to process packets to be delivered to each endpoint.

Conventional media gateways statically bind logical and physical voice-processing resources (e.g., IP addresses, UDP ports, CODECs, SAR chips, DSPs, etc.) to network interface cards (NICs) connected to external networks either at the data link layer (OBI Layer 2) or the IP network layer (OBI Layer 3). Because of the static nature of conventional methods for allocation of media gateway resources, external network topology changes require static reallocation of voice channels within media gateways. Such static resource reallocation is labor-intensive and unsuitable for dynamically changing network environments. For example, a voice chip resource in a media gateway is conventionally assigned a block of static IP addresses through manual provisioning, and each of these static IP addresses is reserved for a remote network. Voice chip resources are not pooled together to serve any one of the remote networks as needed. As a result, the voice-processing capacity available for each remote network is constrained by the data link layer bindings to individual voice processing chips.

FIG. 1 is a block diagram illustrating conventional resource allocation in a media gateway. Referring to FIG. 1, media gateway 100 includes a plurality of voice server cards 102. Each voice server card 102 includes a plurality of voice chips 104. Each voice chip 104 is assigned to serve one of the external networks 106, 108, 110, 112, 114, or 116. A media gateway controller 118 controls media gateway 100 to establish and tear down calls with entities in external networks 106-116.

In the exemplary configuration illustrated in FIG. 1, each external network is statically assigned a single voice chip capable of simultaneously processing K voice channels. The one-to-one assignment is shown in FIG. 1 for illustration only. In actual network implementations, each external network may be statically assigned multiple voice chips, and the processing capability of each voice chip may be statically split and reserved between multiple remote networks. Nevertheless, all these mappings are statically assigned at the IP address level, i.e. at the network layer.

In the example illustrated in FIG. 1, media gateway 100 may include a static resource allocation table that allocates voice chips 104 to external networks 106-116. During signaling required to set up a call, media gateway controller 118 communicates information to external networks 106-116 regarding the IP addresses of the voice chip and network interface card to which the voice packets should be addressed based on the static resource allocation table.

One problem with this allocation scheme is that if one of the external networks wishes to reconfigure or add additional endpoints, the provisioned assignments at media gateway 100 and/or MGC 118 must be reconfigured. For example, if the owners of external network 108 need to add a new VLAN, the resource allocation table in MG 100 would have to be reconfigured to support the new VLAN. Such manual re-provisioning is labor-intensive and unsuitable for dynamically changing networks.

Another problem with the conventional media gateway resource allocation scheme illustrated in FIG. 1 is that voice resources are not efficiently utilized. For instance, since voice chips are statically assigned to serve external networks, load sharing of voice chip resources among different networks cannot be performed. As a result, the load on the voice chips can be unbalanced and calls from one network can be blocked even though voice chip resources assigned to serve another network are available.

Accordingly, in light of the difficulties associated with conventional static allocation of media gateway resources at OBI Layer 2 or OBI Layer 3, there exists a need for improved methods and systems for allocating resources at a media gateway.

DISCLOSURE OF THE INVENTION

The present invention includes improved methods and systems for per-session dynamic management of media gateway resources. The present invention offers a unique method to dynamically and efficiently allocate and interconnect a media gateway's logical and physical resources for each Voice-over-IP (VoIP) call at the UDP port level, i.e. at OBI Layer 4.

The logical resources for a VoIP call include two tuples: the <local IP address for RTP, local UDP port for RTP> pair and, optionally, the <local IP address for RTCP, local UDP port for RTCP> pair. The physical resources for a VoIP call include Network Interface Cards (NICs), a VoIP chip channel, and, optionally, an echo cancellation channel, a transcoding channel, a tone/announcement channel, etc.

Unlike conventional static resource management methods, which bind each local IP address to a specific VoIP chip (in general, a media processing unit) and a specific NIC on the media gateway, the present invention disassociates each local IP address from any specific VoIP chip or NIC. Instead, the present invention allocates and manages the physical and logical resources for a VoIP call by the logical UDP ports within each IP address, i.e. by the <local IP, local UDP> pair, which results in a finer granularity than by the IP address alone. A <local IP, local UDP> pair may be served by any available VoIP chip and may be reachable from multiple NICs via pre-provisioned internal data paths. In one exemplary configuration, each VoIP chip may be reachable from all of the NICs in a media gateway.

To set up a VoIP call, a <local IP, local UDP> pair is allocated from the logical resource pool and assigned to one serving VoIP chip channel. The <local IP, local UDP> pair is communicated to some or all NICs, depending on configured network topology. When an IP packet is received by any of the NICs, the NIC looks up the packet's <local IP, local UDP> pair to identify its serving VoIP chip and the internal data path to that chip. The VoIP chip maps each <local IP, local UDP> pair to its assigned VoIP chip channel.

Rather than statically allocating voice server resources to external networks, a media gateway pools voice server resources provided by a plurality of voice chips in the media gateway and dynamically allocates resources from the pool on a per call or per-session basis. For example, when a new session is requested from the media gateway controller, the media gateway assigns a voice chip to the session independently of the network from which the session originates. Media packets associated with the session are processed by the assigned voice chip. New sessions from the same network may be assigned to the same voice chip or to different voice chips, depending on the load-sharing algorithm used by the dynamic resource manager of the media gateway. Because media gateway resources are dynamically allocated from a common pool, reprovisioning is not required when the topology of one or more external networks changes. In addition, media gateway resources can be more efficiently utilized.

Accordingly, it is an object of the invention to provide methods and systems for dynamic media gateway resource management.

It is another object of the invention to provide a method for dynamically allocating media gateway resources on a per-call (i.e. per-session) basis.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
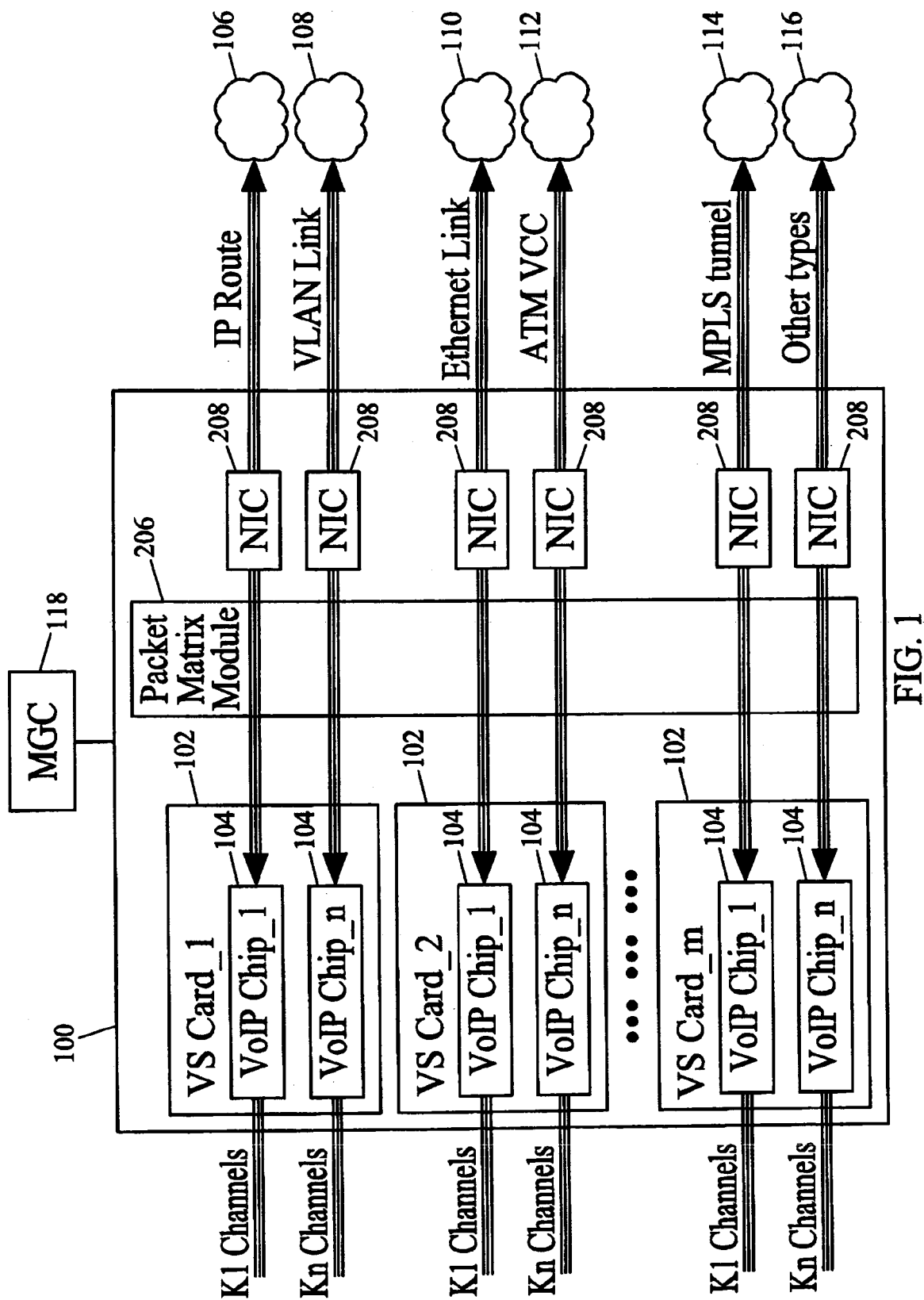
FIG. 1 is a block diagram illustrating conventional static management of media gateway resources.
Figure 2:
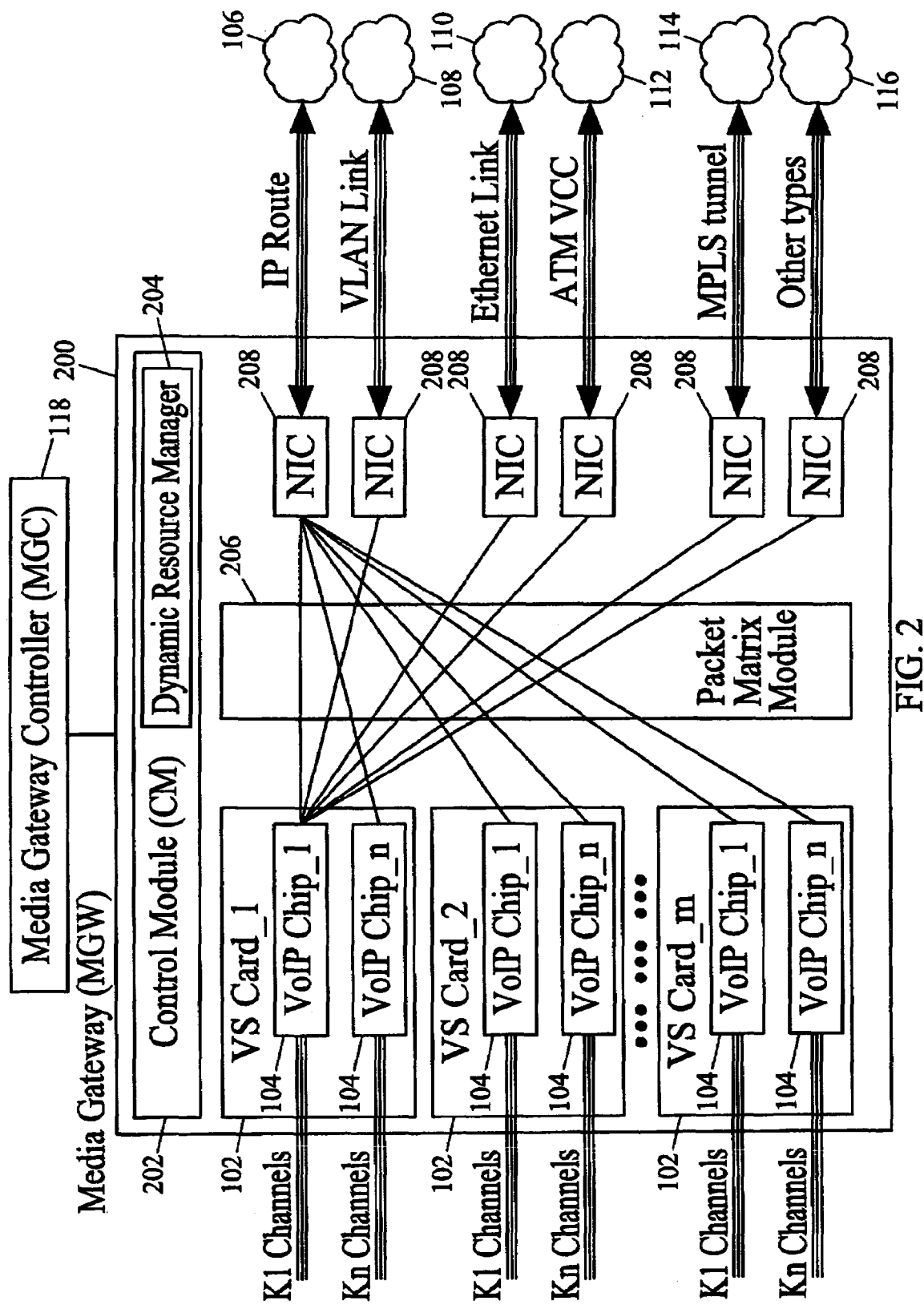
FIG. 2 is a block diagram illustrating per-session dynamic management of media gateway resources according to an embodiment of the present invention.

FIG. 2 illustrates an example of a media gateway including a dynamic resource manager according to an embodiment of the present invention. Referring to FIG. 2, media gateway 200 includes a dynamic resource manager 204 for dynamically allocating voice server resources. Dynamic resource manager 204 may be implemented in hardware, software, firmware, or any combination thereof as part of a control module 202 within media gateway 200.

In FIG. 2, a packet matrix module 206 provides provisioned internal data-paths between the network interface cards 208 and every voice chip 104. For clarity, the full mesh between voice chips 104 and NICs 208 is not shown. It is understood that packet matrix module 206 may provide paths such that each voice chip 104 is reachable from each NIC 208 and vice-versa.

Each of the data paths between voice chips 104 and NICs 208 may be individually provisioned based on total bandwidth, scheduling algorithm, and traffic management policy, etc. As a result, voice chips 104 can be considered a resource pool that can be assigned dynamically to any new session via any of the NICs 208. In one implementation, the incoming connections may be terminated at NICs 208 at the data link layer (e.g. Ethernet, VLAN, ATM, MPLS) or the IP layer, and dynamic resource manager 204 in control module 202 dynamically assigns a voice chip from the pool of voice chips to process each incoming session/call.

Rather than statically assigning voice chips 104 to each external network, dynamic resource manager 204 dynamically allocates voice chips on a per-call (i.e. per-session) basis. As a result, each network is able to use the media-gateway-wide pool of M×N×K channels, where M is the number of voice over cards, N is the number of voice chips on each voice sever card, and K is the number of channels supported by each voice chip. The number of channels per voice chip, K, may be different for different codec types, e.g. G.711, G.726, G.729, etc. In comparison, in the conventional static allocation schemes described above, each external network is only able to access only K or some statically configured number of channels in the media gateway and cannot access voice channels assigned to other external networks. Because every external network now has a shared pool of M×N×K dynamically assignable channels, reprovisioning of media gateway resources is not required when one of the networks adds additional endpoints. In addition, calls can be more evenly distributed among voice chips.

Figure 3:
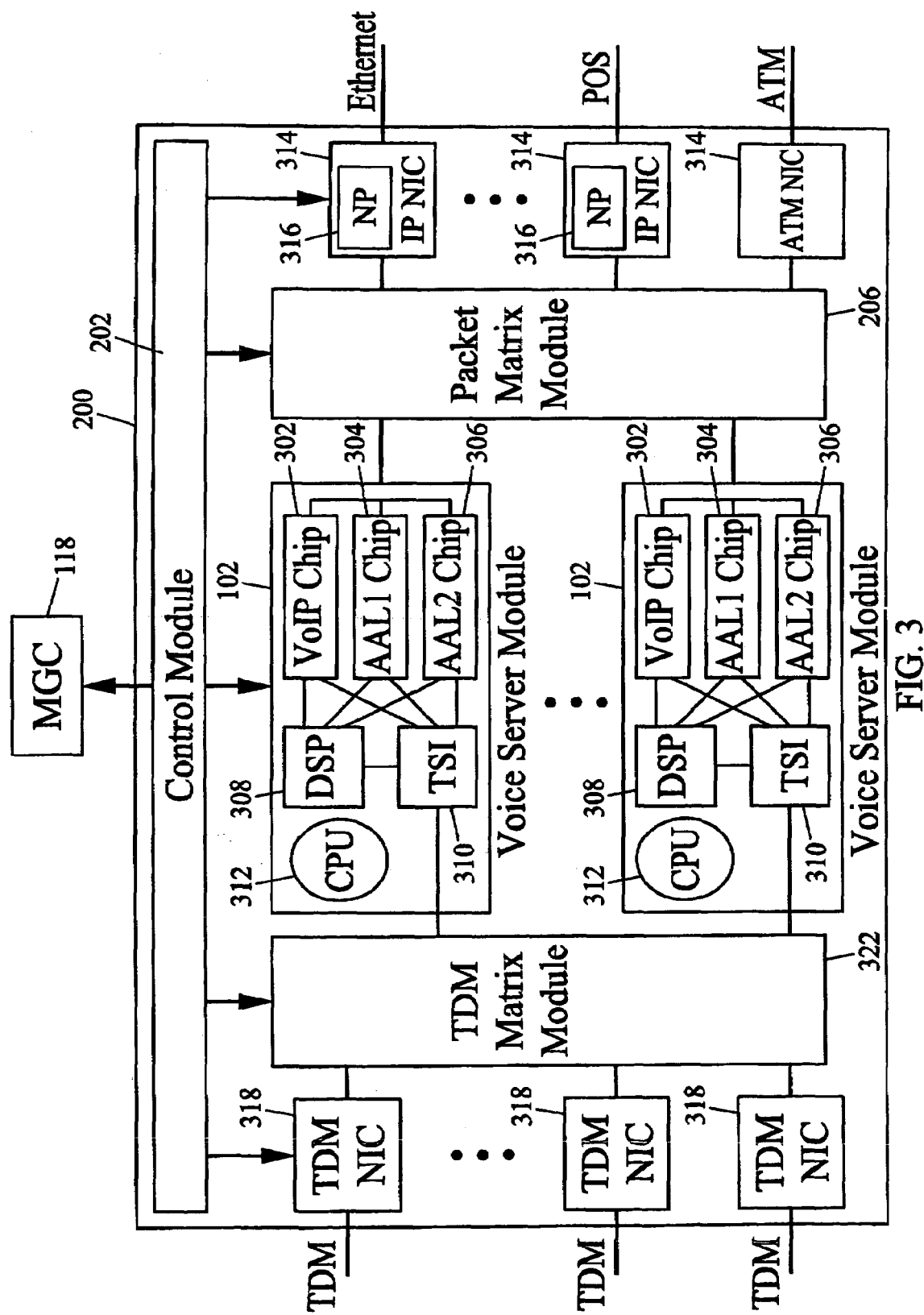
FIG. 3 is a block diagram illustrating an exemplary internal architecture of a media gateway in which the methods and systems of the present invention may be implemented.

FIG. 3 is a block diagram illustrating an exemplary internal architecture for media gateway 200 in more detail. In FIG. 3, media gateway 200 includes voice servers 102, as described above. Each voice server 102 has various voice chips, including voice-over-IP chips 302, voice-over-AAL1 chips 304, and voice-over-AAL2 chips 306. In addition, each voice server includes some digital signal processors 308 (e.g. voice transcoders, echo cancellers, conference bridges, etc.), a time slot interconnection (TSI) 310, a central processing unit (CPU) 312.

In the illustrated example, each voice chip 302 implements one or more voice-over-IP protocols, such as Real time Transmission Protocol (RTP). Each voice chip 304 implements ATM Adaptation Layer 1 (AAL1) functions. Each voice chip 306 implements ATM Adaptation Layer 2 (AAL2) functions. DSP 308 provides transcoding, echo cancellation and other payload-transformation functions. TSI 310 makes on-demand connections between VoIP chip channels, TDM matrix channels, and DSPs. CPU 312 controls the overall operation of each voice server module 102.

In addition to voice server modules 102, media gateway 200 includes a plurality of network interface cards 314. Each network interface card 314 implements network layer functions and packet forwarding functions, such as IP forwarding functions. In the illustrated example, different network interface cards are provided to connect to external Ethernet, Packet-Over-SONET (POS), ATM, and MPLS networks.

In addition to packet-based network interface cards, media gateway 200 may also include TDM network interface cards 318. TDM network interface cards 318 send and receive voice frames from external TDM networks. TDM network interface cards 318 may implement any suitable physical layer protocols for sending and receiving voice frames over TDM links. For example, each TDM NIC 318 may terminate one or more TDM voice trunks.

In order to switch media packets between network interface cards 314 and voice server modules 102, media gateway 200 includes a packet matrix module 206. Packet matrix module 206 switches packets under the control of control module 202. As discussed above, packet matrix module 206 may connect every packet NIC to every voice chip 302. In addition to packet matrix module 206, gateway 200 may also include a TDM matrix module 322 for switching traffic that are carried in each TDM timeslot. TDM matrix module 322 is also controlled by control module 320.

In addition to controlling the packet and TDM matrices, control module 202 implements dynamic voice server resource allocation according to the present invention. For example, control module 202 may communicate with an internal or external media gateway controller to dynamically allocate logical and physical resources for each call.

Figure 4:
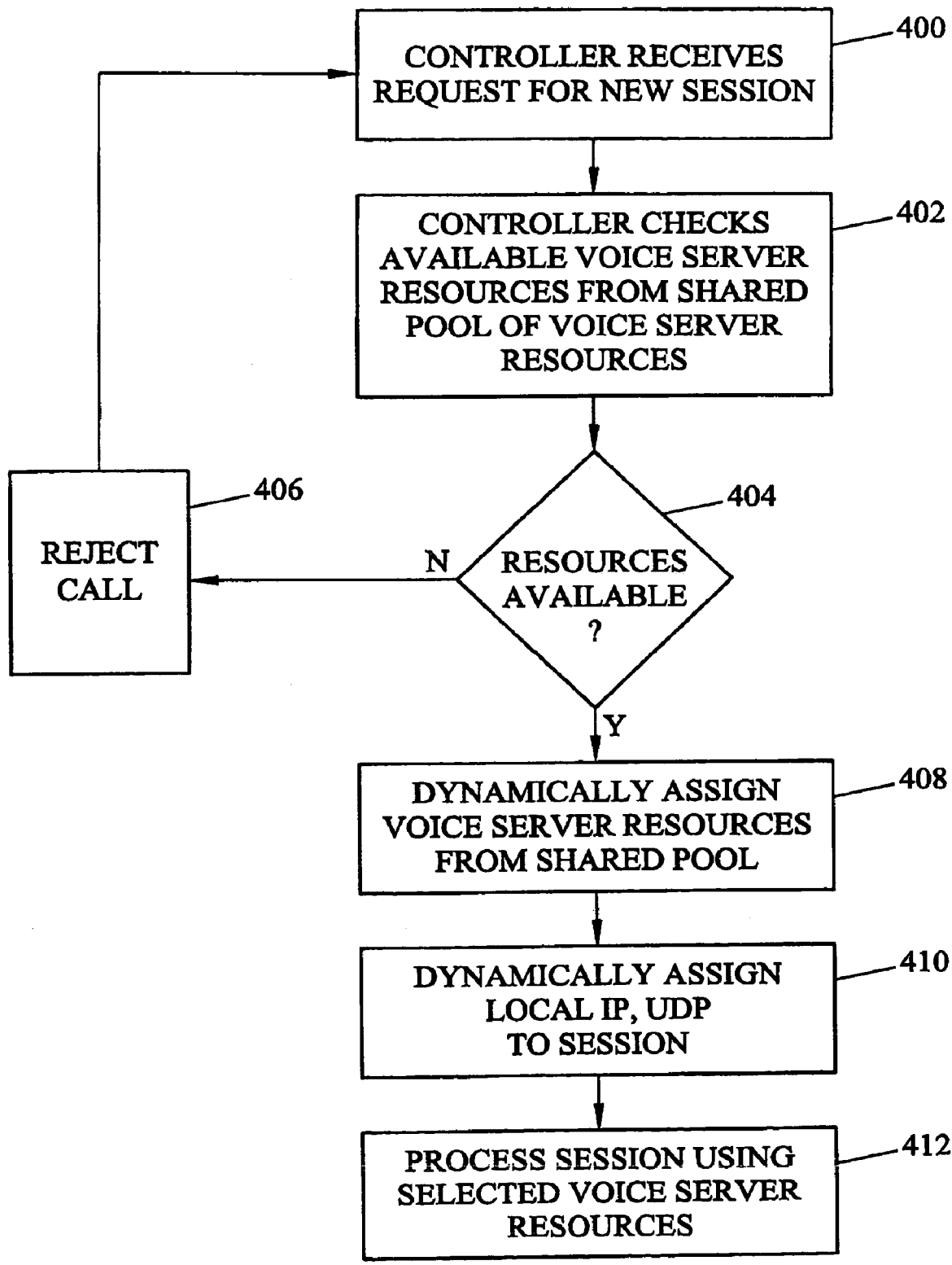
FIG. 4 is a flow chart illustrating a method for dynamic management of media gateway resources according to an embodiment of the present invention.

FIG. 4 is a flow chart illustrating exemplary steps that may be performed by control module 202 in dynamically allocating voice server resources according to an embodiment of the present invention. Referring to FIG. 4, in step 400, control module 202 receives a request for a new call/session. The request may be generated by media gateway controller 118 in response to a call setup message associated with a new call. The call setup message may be an ISUP IAM message, a PRI SETUP message, a SIP INVITE message, or any other suitable type of call setup message for initiating a call. In step 402, control module 202 checks available voice server resources from the shared pool of voice server resources to determine whether any resources are available. In step 404, if resources are not available, control proceeds to step 406 where the call attempt is rejected.

If, in step 404, control module 202 determines that resources are available, control proceeds to step 406 where control module 202 dynamically assigns voice server resources from a shared pool. Dynamically assigning voice server resources may include assigning a voice chip to process the media stream for the session. The voice chip is preferably selected independently of the remote network. Because there is no fixed association between the remote network and the voice chip, each call/session has access to all of the available resources of media gateway 200. As a result, voice server resources of media gateway 200 are more efficiently allocated than in conventional media gateways. In addition, when the topology of an external network changes, because resources at media gateway 200 are dynamically allocated, there is no need to manually reconfigure media gateway 200.

In step 410, control module 202 dynamically assigns a local IP address and a local UDP port to the RTP flow of the session. The combination of local IP address and UDP port number is unique among current sessions. The local IP address and UDP port combination is preferably assigned to a voice chip for the duration of the session. The local IP address and UDP port combination is communicated to the remote end of a session by media gateway controller 118. The remote end of the session will then send subsequent media stream packets to the local IP address and UDP port combination. Packet forwarding tables on each packet network interface 314 are updated so that packets addressed to the local IP and UDP combination assigned to the voice server chip are forwarded to the appropriate voice chip. Because the forwarding tables at each NIC 314 are dynamically constructed and updated as calls are established and released, media gateway 200 is capable of adapting to dynamically changing network conditions.

Figure 5:
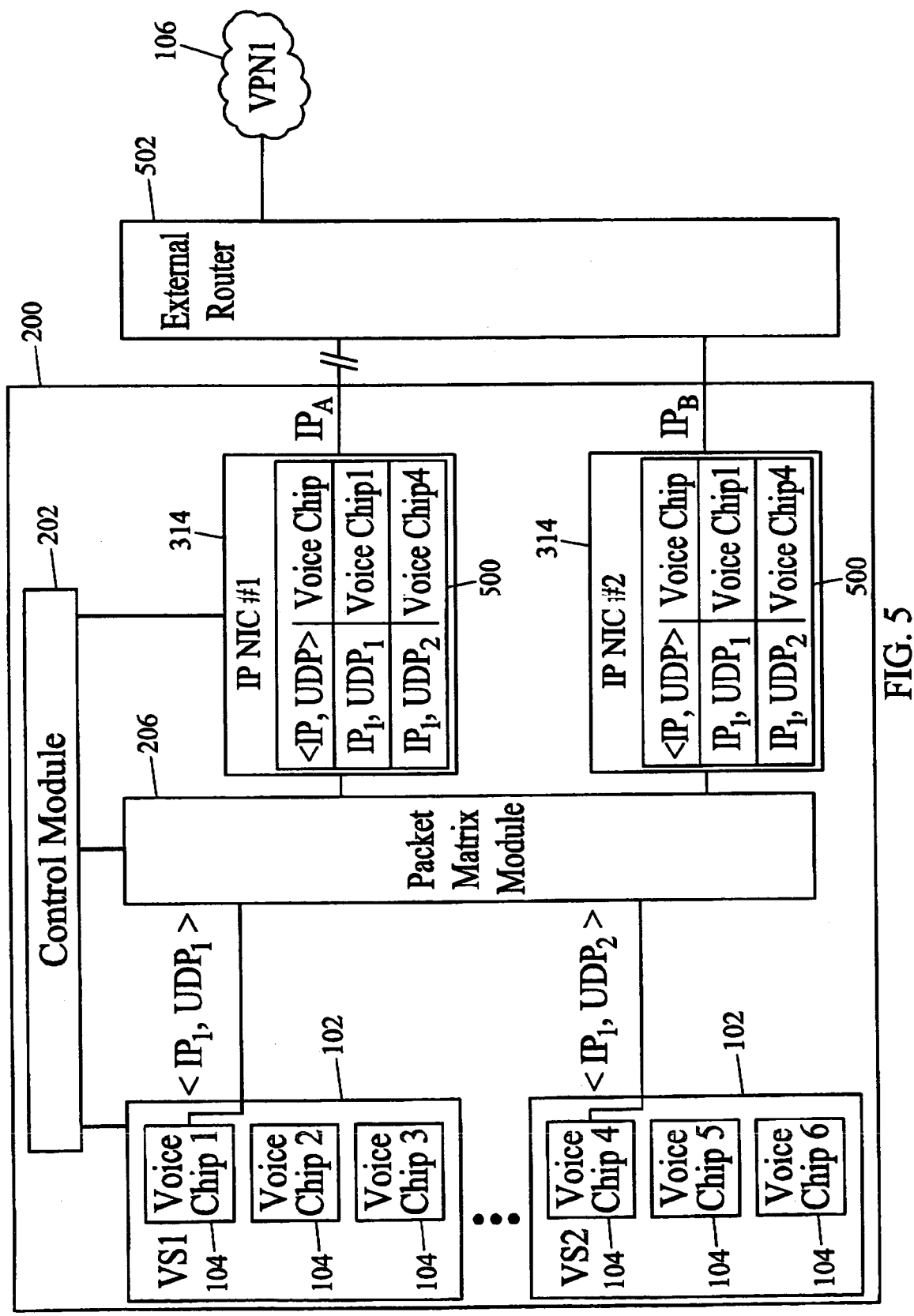
FIG. 5 is a block diagram illustrating exemplary rerouting of a voice stream when a network interface fails according to an embodiment of the present invention.

FIG. 5 illustrates dynamic resource allocation and <IP, UDP> address assignment according to the invention in more detail. In FIG. 5, it is assumed that VPN1 106 requests a first voice channel with gateway 200. Gateway 200 dynamically assigns a channel on voice chip 1 104 to the session and associates the local IP address, UDP port pair <$IP_1$, $UDP_1$> to the voice chip. In one exemplary implementation, control module 202 multicasts the address combination <$IP_1$, $UDP_1$> to all NICs 314. Each IP NIC 314 includes a packet-forwarding table 500 that is updated to reflect that the combination <$IP_1$, $UDP_1$> is associated with voice chip 1. Each IP NIC 314 includes its own IP address that it advertises to external nodes, such as external router 502. The present invention places no specific requirements on any external router. An external router 502 may use any routing method to deliver IP packets to the media gateway. In the illustrated example, since both NICs 314 have routes to IP address $IP_1$, the external router 502 may use its own routing policies to select any route at any point of time.

If the path between external router 502 and IP NIC #1 314 fails, the forwarding table in external router 502 will be updated to set the cost associated with the route via IP address $IP_A$ to a predetermined large value. In this situation, external router 502 would reroute the voice stream packets to NIC#2 314 directly or via other transmit routers. Because NIC#2 314 includes a route to <$IP_1$, $UDP_1$>, interruption in service will not occur when the path to one of the IP NICs fails. In addition, because voice server resource allocation information is multicast among NICs 314, failure of any NIC will not make the voice server resources unreachable from outside. In this scenario, IP routing protocols would notify external routers to update their forwarding tables to reroute media packets over one of the operational NICs. In static resource allocation schemes, where each session uses the statically assigned IP address bound to a specific media gateway NIC, failure of the NIC would result in failure of the session. Thus, the present invention is more robust than conventional static media gateway resource allocation schemes.

Another advantage of the dynamic resource allocation schemes of the present invention is real-time adaptability to network topology changes. Unlike conventional media gateway implementations, if VPN1 106 needs to establish a second connection with the media gateway, VPN1 106 is not limited to utilizing voice chip 1 104. In the illustrated example, it is assumed that the second connection from VPN1 106 is assigned to voice chip 4 104. The <IP, UDP> address combination assigned to the second session is assumed to be <$IP_1$, $UDP_2$>. In conventional media gateway implementations, subsequent sessions from VPN1 106 would be routed to the same voice chip. By dynamically allocating voice chips and local <IP, UDP> address combinations, the present invention breaks the fixed association between voice server resources and external networks, thus allow newly added external terminals to access the existing voice server resources within a media gateway without any manual reconfiguration. As a result, gateway 200 illustrated in FIG. 5 is more easily adaptable to subscriber changes in external networks than conventional media gateway implementations.

Returning to FIG. 4, once a local IP address and UDP port combination has been assigned to a session and resources have been allocated for the session, media gateway 200 processes a session using the associated resources. Processing the session using the associated resources first includes forwarding packets by their destination IP address and destination UDP port to the voice chip dynamically assigned to the session. The voice chip dynamically assigned to the session then performs voice processing on media packets associated with the session. Exemplary operations that may be performed by the assigned voice chip may include segmentation and reassembly (SAR), echo cancellation, transcoding, DTMF detection, DTMF generation, announcement, conference bridging, Internet Fax, and law enforcement. Once the voice packets associated with the session have been processed, the voice packets may be sent from the voice chip to one of the network interface cards 314 or to a TDM network interface card for transmission to the remote end of a session. If the remote end of a session is an IP connection, IP NICs 314 may route the outbound packet to the remote end of the session using IP forwarding tables 500. Once a session ends, the local <IP, UDP> address combination assigned to the session may be returned to a common pool for assignment to a new session.

The present invention is not limited to identifying sessions using destination IP address and destination UDP port. In an alternate implementation of the invention, each session may be identified by a combination of destination IP address, destination UDP port, source IP address, and source UDP port. Using all four parameters to identify a session may be advantageous for firewall filtering purposes. Using any combination of identifiers in session packets to uniquely identify sessions is intended to be within the scope of the invention.

Figure 6:
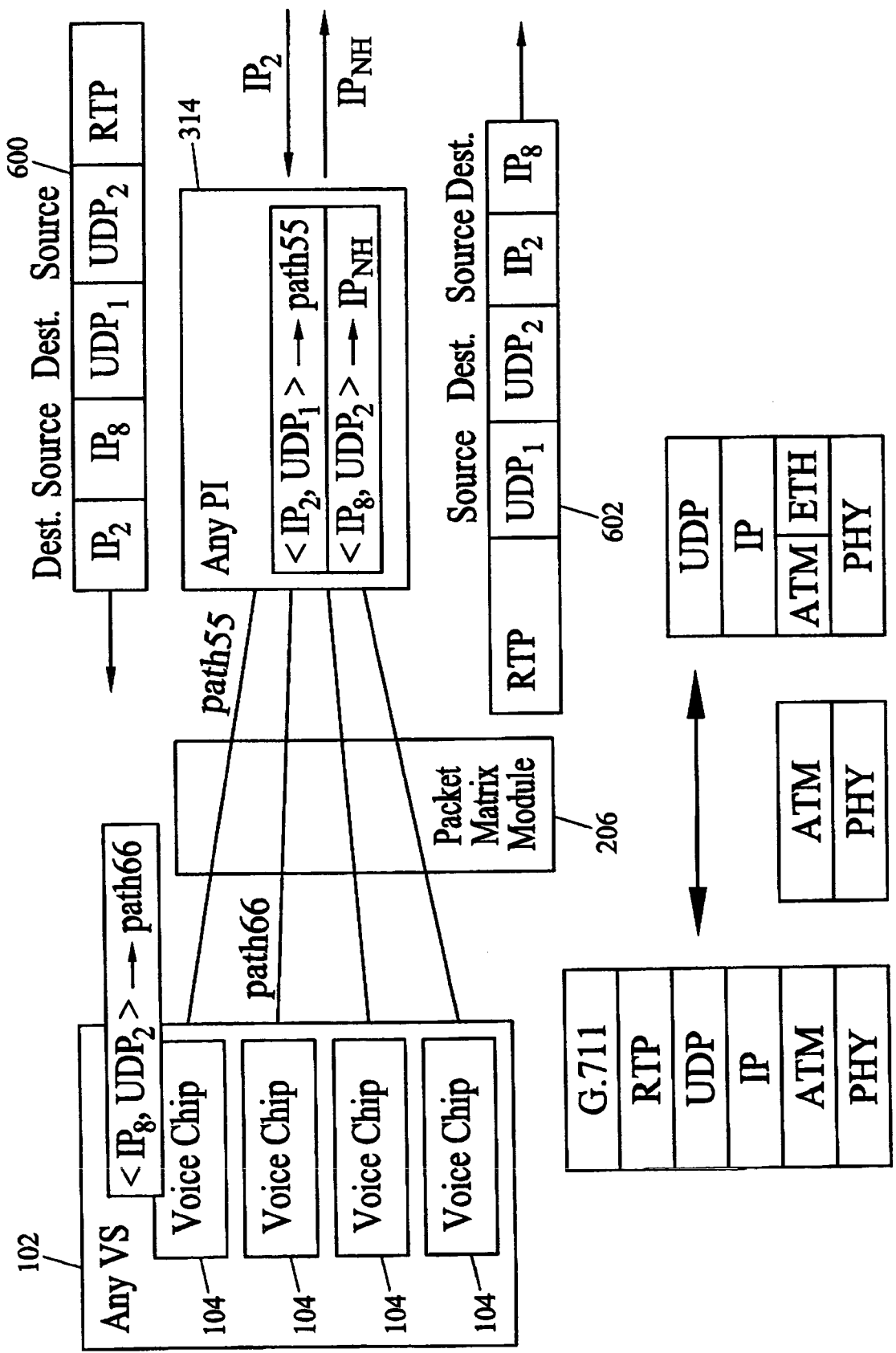
FIG. 6 is a block diagram illustrating exemplary incoming and outgoing packet processing by a media gateway according to an embodiment of the present invention.

FIG. 6 illustrates the forwarding of inbound and outbound media packets in more detail. In FIG. 6, an incoming packet 600 addressed to <IP$_2$, UDP$_1$> arrives at packet interface 314. In this example, it is assumed that voice server resources have already been assigned to the session with which packet 600 is associated, and the packet interface 314 session has been notified by the control module of the established association. Because packet interface 314 is session-aware, packet interface 314 forwards the packet based on the <destination IP address, destination UDP port> combination to a voice chip associated with this combination. In the illustrated example, packet 600 travels to voice chip 104 over a pre-configured internal data path Path55 through the packet matrix to voice chip 104. Voice chip 104 processes the packets associated with the session, switches the source and destination IP and UDP ports in the packets, and forwards outbound packet 602 to packet interface 314 over another pre-configured internal data path Path66. Packet interface 314 forwards outbound packet 602 to the next hop IP address associated with the remote end of the session. Thus, by making interfaces session-aware, the present invention provides increased packet interface functionality over conventional media gateway solutions in which packet interfaces only perform data-link layer (Layer 2) or IP layer (Layer 3) forwarding.

Thus, as described above, the present invention includes methods and systems for dynamic allocation of media gateway resources on a per session basis. Incoming packets are dynamically assigned to voice chip resources on a per session basis. Once a voice chip resource has been assigned to a session, resource allocation tables associated with packet interfaces are updated to include the session information. Subsequent packets associated with the session are then forwarded to the selected voice chip resource.

By breaking the static bindings between voice chip resources and external networks, the present invention reduces the impact of network topology changes on media gateway functionality. In addition, each new session may be served by any of the pooled M×N×K channels, where M is the number of voice over cards, N is the number of voice chips on each voice sever card, and K is the number of channels supported by each voice chip. The value of K depends on the actual codec type. Such pooled resources can be contrasted with conventional statically allocated media gateway implementations where sessions are statically assigned to voice chips and therefore only have K or some statically configured number of channels available. Finally, a media gateway according to the present invention has enhanced fail-over capabilities because resource assignment information is multicast to multiple packet interfaces. Thus, if a packet interface or a route to a packet interface fails, the voice chip resources associated with each session are still reachable through other packet interfaces.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for dynamic media gateway resource management, the method comprising:
   at a media gateway for switching voice packets between a plurality of input ports and output ports:
   (a) pooling voice server resources provided by a plurality of voice chips in the media gateway, wherein pooling voice server resources includes combining M voice server cards into the shared pool of voice server resources, M being an integer, wherein each voice server card includes $N_m$ voice chips, $N_m$ being an integer representing the number of voice chips on the m$^{th}$ voice server card, and each voice chip supports $K_{mn}$ voice channels, $K_{mn}$ being an integer representing the number of channels of the n$^{th}$ voice chip on the m$^{th}$ voice server card;
   (b) for each new call/session originating from the packet network, dynamically allocating a voice chip from the pooled voice server resources;
   (c) dynamically assigning a logical resource identifier to each session;
   (d) receiving a plurality of voice packets relating to a call/session from a plurality of different external networks and sending a plurality of voice packets relating to the call/session to the external networks; and
   (e) processing voice packets associated with each session using the voice chip dynamically assigned to the session.

2. The method of claim 1 wherein dynamically allocating a voice chip from the pooled voice server resources includes selecting a voice channel from the pool of $\Sigma_{m=1\_to\_M} \Sigma_{n=1\_to\_Nm} K_{mn}$ voice channels.

3. The method of claim 1 where $N_m$ and $K_{mn}$ are different for at least some of the voice chips.

4. The method of claim 1 wherein $N_m$ and $K_{mn}$ are the same for all of the voice chips.

5. The method of claim 1 wherein dynamically assigning a logical resource identifier for each session includes assigning a local IP address and UDP port for the media flow of each session.

6. The method of claim 5 comprising dynamically building a voice server resource allocation table indexed by the local IP address and UDP port assigned to each session.

7. The method of claim 5 comprising dynamically receiving via call signaling channel or learning at run-time a remote IP address and a remote UDP port representing a remote endpoint corresponding to each session.

8. The method of claim 1 wherein processing the voice packets associated with each session using the voice chip dynamically assigned to each session includes performing segmentation and reassembly (SAR) operations for each session.

9. The method of claim 1 wherein processing the voice packets associated with each session using the voice chip dynamically assigned to each session includes performing at least one of echo cancellation, transcoding, tone detection and generation, announcement playout, media recording, and conference bridging.

10. The method of claim 1 comprising multicasting session identifiers associated with each session to a plurality of network interface cards in the media gateway.

11. The method of claim 10 comprising, in response to failure of a route to one of the network interface cards, routing packets associated with a session to its assigned voice chip over an alternate network interface card.

12. The method of claim 1 comprising routing outbound packets associated with each session over a network interface card.

13. The method of claim 12 comprising selecting an outbound network interface card from a pool of network interface cards.

14. The method of claim 1 comprising terminating a data link layer connection associated with each session at one of a plurality of network interface cards within the media gateway and wherein processing voice packets associated with each session using the assigned voice processing resource includes forwarding packets from the network interface card to the voice processing resource using the logical resource identifier assigned to each session and one or more addresses in each received packet.

15. A method for dynamic media gateway resource management, the method comprising:
at a media gateway for switching voice packets between a plurality of input ports and output ports:
(a) pooling voice server resources provided by a plurality of voice chips in the media gateway, wherein pooling voice server resources includes combining M voice server cards into the shared pool of voice server resources, M being an integer, wherein each voice server card includes $N_m$ voice chips, $N_m$ being an integer representing the number of voice chips on the $m^{th}$ voice server card, and each voice chip supports $k_{mn}$ voice channels, $K_{mn}$ being an integer representing the number of channels of the $n^{th}$ voice chip on the $m^{th}$ voice server card;
(b) for each new call/session originating from the packet network, dynamically allocating a voice chip from the pooled voice server resources wherein dynamically allocating a voice chip from the pooled voice server resources includes allocating the voice chip independently of a remote endpoint assigned to each session;
(c) dynamically assigning a logical resource identifier to each session;
(d) receiving a plurality of voice packets relating to a call/session from a plurality of different external networks and sending a plurality of voice packets relating to the call/session to the external networks;
(e) terminating a data link layer connection associated with each session at one of a plurality of network interface cards within the media gateway; and
(f) processing voice packets associated with each session using the voice chip dynamically assigned to the session, wherein processing voice packets associated with each session using the assigned voice processing resource includes forwarding packets from the network interface card to the voice processing resource using the logical resource identifier assigned to each session and one or more addresses in each received packet and wherein forwarding each packet to the assigned voice processing resource includes forwarding each packet by comparing a destination IP address, destination UDP port, source UDP port combination in each packet to a plurality of local IP address, local UDP port, remote IP address, remote UDP port combinations assigned to active sessions in the media gateway.

16. A method for dynamic media gateway resource management, the method comprising:
at a media gateway for switching voice packets between a plurality of input ports and output ports:
(a) pooling voice server resources provided by a plurality of voice chips in the media gateway;
(b) for each new call/session, dynamically allocating a voice chip from the pooled voice server resources;
(c) dynamically assigning a logical resource identifier to each session;
(d) receiving a plurality of voice packets relating to a call/session from a plurality of different external networks and sending a plurality of voice packets relating to the call/session to the external networks;
(e) terminating a data link layer connection associated with each session at one of a plurality of network interface cards within the media gateway; and
(f) processing voice packets associated with each session using the voice chip dynamically assigned to the session wherein processing voice packets associated with each session using the assigned voice processing resource includes forwarding packets from the network interface card to the voice processing resource using the logical resource identifier assigned to each session and one or more addresses in each received packet and wherein forwarding each packet to the assigned voice processing resource includes forwarding each packet by comparing a destination IP address, destination UDP port combination in each packet to a plurality of destination IP address, destination UDP port combinations assigned to active sessions in the media gateway.

17. A method for dynamic media gateway resource management, the method comprising:
at a media gateway for switching voice packets between a plurality of input ports and output ports:
(a) pooling voice server resources provided by a plurality of voice chips in the media gateway;
(b) for each new call/session, dynamically allocating a voice chip from the pooled voice server resources;
(c) dynamically assigning a logical resource identifier to each session;
(d) receiving a plurality of voice packets relating to a call/session from a plurality of different external networks and sending a plurality of voice packets relating to the call/session to the external networks;
(e) terminating a data link layer connection associated with each session at one of a plurality of network interface cards within the media gateway; and
(f) processing voice packets associated with each session using the voice chip dynamically assigned to the session wherein processing voice packets associated with each session using the assigned voice processing resource includes forwarding packets from the network interface card to the voice processing resource using the logical resource identifier assigned to each session and one or more addresses in each received packet and wherein forwarding each packet to the assigned voice processing resource includes forwarding each packet by comparing a destination IP address, destination UDP port, source IP address, source UDP port combination in each packet to a plurality of local IP address, local UDP port, remote IP address, remote UDP port combinations assigned to active sessions in the media gateway.

18. A system for dynamic media gateway resource allocation on a per session basis, the system comprising:
(a) a plurality of voice chips being pooled in a common resource pool for performing voice processing operations on media packets associated with a session, wherein pooling voice server resources includes combining M voice server cards into the shared pool of voice server resources, M being an integer, wherein each voice server card includes $N_m$ voice chips, $N_m$ being an integer representing the number of voice chips on the $m^{th}$ voice server card, and each voice chip supports $K_{mn}$ voice channels, $K_{mn}$ being and integer representing the number of channels of the $n^{th}$ voice chip on the $m^{th}$ voice server card where $N_m$ and $K_{mn}$ are different for at least some of the voice chips;
(b) a plurality of network interfaces coupled to the voice chips for forwarding incoming media packets to the voice chips and forwarding outbound media packets from the voice chips to external networks; and
(c) a dynamic resource manager operatively associated with the packet interfaces and the voice chips for dynamically allocating voice chips from the common resource pool to process new sessions on a per session basis and dynamically assigning a logical resource identifier to each session.

19. The system of claim 18 wherein the voice chips perform encoding and decoding (CODEC) operations on the media packets.

20. The system of claim 18 wherein the voice chips perform segmentation and reassembly (SAR) operations on the media packets.

21. The method of claim 18 wherein the voice chips perform echo cancellation and other functions on the media packets.

22. The system of claim 18 wherein the network interfaces include IP network interfaces.

23. The system of claim 18 wherein the network interfaces include TDM network interfaces.

24. The system of claim 18 wherein the network interfaces include at least one of Ethernet, ATM, and MPLS network interfaces.

25. The system of claim 18 wherein each network interface includes a resource allocation table being dynamically constructed from incoming media packets.

26. The system of claim 18 wherein the manager dynamically assigns a session identifier to each new session.

27. The system of claim 26 wherein the manager multicasts the session identifiers to the network interface cards.

28. The system of claim 27 wherein each network interface forwards media packets associated with any session to the voice chip assigned to the session using the session identifiers.

29. A system for dynamic media gateway resource allocation on a per session basis, the system comprising:
(a) a plurality of voice chips being pooled in a common resource pool for performing voice processing operations on media packets originating from a packet network, wherein pooling voice server resources includes combining M voice server cards into the shared pool of voice server resources, M being an integer, wherein each voice server card includes $N_m$ voice chips, $N_m$ being an integer representing the number of voice chips on the $m^{th}$ voice server card, and each voice chip supports $K_{mn}$ voice channels, $K_{mn}$ being and integer representing the number of channels of the $n^{th}$ voice chip on the $m^{th}$ voice server card where $N_m$ and $K_{mn}$ are different for at least some of the voice chips;
(b) a plurality of network interfaces coupled to the voice chips for forwarding incoming media packets originating from the packet network to the voice chips and forwarding outbound media packets from the voice chips to external networks wherein each network interface includes a resource allocation table being dynamically constructed from incoming media packets and wherein the resource allocation table includes a local IP address and local UDP port combination assigned to each session; and
(c) a dynamic resource manager operatively associated with the packet interfaces and the voice chips for dynamically allocating voice chips from the common resource pool to process new sessions originating from the packet network on a per session basis and dynamically assigning a logical resource identifier to each session.

30. The system of claim 29 wherein the resource allocation table in each network interface includes a remote IP and UDP port combination associated with each session.

31. A system for dynamic media gateway resource allocation on a per session basis, the system comprising:
(a) a plurality of voice chips being pooled in a common resource pool for performing voice processing operations on media packets, wherein pooling voice server resources includes combining M voice server cards into the shared pool of voice server resources, M being an integer, wherein each voice server card includes $N_m$ voice chips, $N_m$ being an integer representing the number of voice chips on the $m^{th}$ voice server card, and each voice chip supports $K_{mn}$ voice channels, $K_{mn}$ being and integer representing the number of channels of the $n^{th}$ voice chip on the $m^{th}$ voice server card where $N_m$ and $K_{mn}$ are different for at least some of the voice chips;
(b) a plurality of network interfaces coupled to the voice chips for forwarding incoming media packets to the voice chips and forwarding outbound media packets from the voice chips to external networks; and
(c) a dynamic resource manager operatively associated with the packet interfaces and the voice chips for dynamically allocating voice chips from the common resource pool to process new sessions on a per session basis wherein the manager dynamically assigning a logical resource identifier to each session and dynamically assigns a session identifier to each new session and wherein the session identifier includes a local IP address and local UDP port combination.

32. The system of claim 31 wherein the session identifier includes a remote IP address and remote UDP port combination.

33. A computer program product comprising computer executable instructions embodied in a tangible computer readable medium and which when executed by a processor of a computer perform steps comprising:
(a) pooling voice server resources provided by a plurality of voice chips in the media gateway, wherein pooling voice server resources includes combining M voice server cards into the shared pool of voice server resources, M being an integer, wherein each voice server card includes $N_m$ voice chips, $N_m$ being an integer representing the number of voice chips on the $m^{th}$ voice server card, and each voice chip supports $K_{mn}$ voice channels, $K_{mn}$ being an integer representing the number of channels of the $N^{th}$ voice chip on the $m^{th}$ voice server card;

(b) for each new call/session originating from the packet network, dynamically allocating a voice chip from the pooled voice server resources;

(c) dynamically assigning a logical resource identifier to each session, wherein dynamically assigning a logical resource identifier to each session includes dynamically allocating a local IP address and local UDP port for each session;

(d) receiving a plurality of media packets relating to a session from a plurality of different external networks and sending a plurality of media packets relating to the session to the external networks; and (e) processing the media packets associated with each session using the voice chip dynamically assigned to the session.

34. The computer program product of claim 33 wherein receiving and sending media packets includes receiving and sending media packets over an Internet Protocol (IP) network.

35. The computer program product of claim 33 wherein receiving and sending media packets includes receiving and sending media packets transmitted over an ATM, Ethernet, SONET, or MPLS network.

36. The computer program product of claim 33 comprising associating the local IP address and local UDP port with the voice chip assigned to each session.

37. The computer program product of claim 33 wherein dynamically assigning a logical resource identifier to each session includes dynamically receiving via call signaling path or learning at run-time a remote IP address and a remote UDP port representing the remote endpoint in each session.

38. A computer program product comprising computer executable instructions embodied in a tangible computer readable medium and which when executed by a processor of a computer perform steps comprising:

(a) for each new call/session, dynamically allocating a voice chip from a pool of voice chips to process voice packets associated with the session, wherein dynamically allocating a voice chip from a pool of voice chips includes dynamically allocating a channel from a set of $\Sigma_{m=1\_to\_M}\Sigma_{n=1\_to\_Nm}K_{mn}$ voice channels, where M is an integer representing a number of voice server cards, $N_m$ is an integer representing the number of voice chips equipped on the m-th voice server card, and $K_{mn}$ is an integer representing the number of voice channels of the n-th voice chip of the m-th voice server card;

(b) dynamically assigning a logical resource identifier to each session, wherein dynamically assigning a logical resource identifier to each session includes dynamically allocating a local IP address and local UDP port for each session;

(c) receiving a plurality of voice packets relating to a session from a plurality of different external networks and sending a plurality of voice packets relating to the session to the external networks; and (d) processing the voice packets associated with each session using the voice chip dynamically assigned to the session.

39. A computer program product comprising computer executable instructions embodied in a tangible computer readable medium and which when executed by a processor of a computer perform steps comprising:

(a) for each new call/session, dynamically allocating a voice chip from a pool of voice chips to process voice packets associated with the session, wherein dynamically allocating a voice chip from a pool of voice chips includes dynamically allocating a channel from a set of $\Sigma_{m=1\_to\_m}\Sigma_{n=1\_to\_Nm}K_{mn}$ voice channels, where M is an integer representing a number of voice server cards, $N_m$ is an integer representing the number of voice chips equipped on the m-th voice server card, and $K_{mn}$ is an integer representing the number of voice channels of the n-th voice chip of the m-th voice server card, wherein $N_m$ and $K_{mn}$ are different for at least some of the voice chips;

(b) dynamically assigning a logical resource identifier to each session, wherein dynamically assigning a logical resource identifier to each session includes dynamically allocating a local IP address and local UDP port for each session;

(c) receiving a plurality of voice packets relating to a session from a plurality of different external networks and sending a plurality of voice packets relating to the session to the external networks; and (d) processing the voice packets associated with each session using the voice chip dynamically assigned to the session.

40. A computer program product comprising computer executable instructions embodied in a tangible computer readable medium and which when executed by a processor of a computer perform steps comprising:

(a) for each new call/session, dynamically allocating a voice chip from a pool of voice chips to process voice packets associated with the session, wherein dynamically allocating a voice chip from a pool of voice chips includes dynamically allocating a channel from a set of $\Sigma_{m=1\_to\_m}\Sigma_{n=1\_to\_Nm}K_{mn}$ voice channels, where M is an integer representing a number of voice server cards, $N_m$ is an integer representing the number of voice chips equipped on the m-th voice server card, and $K_{mn}$ is an integer representing the number of voice channels of the n-th voice chip of the m-th voice server card, wherein $N_m$ and $K_{mn}$ are the same for all of the voice chips;

(b) dynamically assigning a logical resource identifier to each session, wherein dynamically assigning a logical resource identifier to each session includes dynamically allocating a local IP address and local UDP port for each session;

(c) receiving a plurality of voice packets relating to a session from a plurality of different external networks and sending a plurality of voice packets relating to the session to the external networks; and (d) processing the voice packets associated with each session using the voice chip dynamically assigned to the session.

* * * * *